United States Patent
Zhou et al.

(10) Patent No.: US 7,983,566 B2
(45) Date of Patent: Jul. 19, 2011

(54) METHOD FOR IMPROVING THE PERFORMANCE OF PHASE-MODULATED COMMUNICATION SYSTEMS IN AN OPTICAL NETWORK

(75) Inventors: Xiang Zhou, Holmdel, NJ (US); Guodong Zhang, Manalapan, NJ (US)

(73) Assignee: AT&T Intellectual Property II, LLP, Atlanta, GA (US)

( * ) Notice: Subject to any disclaimer, the term of this patent is extended or adjusted under 35 U.S.C. 154(b) by 727 days.

(21) Appl. No.: 12/069,635

(22) Filed: Feb. 12, 2008

(65) Prior Publication Data
US 2009/0202258 A1   Aug. 13, 2009

(51) Int. Cl.
*H04B 10/12*   (2006.01)
*H04B 10/00*   (2006.01)
*H04B 10/04*   (2006.01)

(52) U.S. Cl. ........ 398/149; 398/150; 398/161; 398/188; 398/192

(58) Field of Classification Search .................. 398/149, 398/150, 161, 182, 183, 185, 188, 192, 193
See application file for complete search history.

(56) References Cited

U.S. PATENT DOCUMENTS
6,795,596 B2 *  9/2004  Bulow ................ 385/4
2007/0297043 A1 * 12/2007 Kao et al. ............ 359/337
2009/0074428 A1 *  3/2009  Liu .................. 398/208

* cited by examiner

*Primary Examiner* — Dalzid Singh
(74) *Attorney, Agent, or Firm* — Hoffman & Baron, LLP (57) ABSTRACT

A method and system for improving the performance of a differential-phase modulated optical communication system is disclosed. The system comprises a demodulator having a tunable element to adjust the free-spectral range (FSR) thereof, and a tunable phase shifter to adjust a frequency of a signal passing therethrough.

20 Claims, 6 Drawing Sheets

DBPSK DEMODULATOR

FIG. 2(b)
PRIOR ART

DBPSK DEMODULATOR

DBPSK DEMODULATOR

FIG. 4(b)

DBPSK DEMODULATOR

FIG. 5(a)

DBPSK DEMODULATOR

FIG. 5(b)

DBPSK DEMODULATOR

FIG. 6

METHOD FOR IMPROVING THE PERFORMANCE OF PHASE-MODULATED COMMUNICATION SYSTEMS IN AN OPTICAL NETWORK

FIELD OF THE INVENTION

The present invention relates generally to optical networking, and more particularly, to improving the performance of a differential-phase modulated optical communications system. The improvements allow different wavelengths to be optimized individually and dynamically for optimal system performance.

BACKGROUND OF THE INVENTION

Phase-based modulation techniques such as the differential binary phase-shift-keying (DBPSK) and differential quadrature phase shift key (DQPSK) have received significant attentions in recent years due to their superior tolerance to amplified spontaneous emission (ASE) noise and fiber nonlinear impairments as compared to traditional intensity-based modulations techniques such as non-return-to-zero (NRZ), return-to-zero (RZ), carrier suppressed return-to-zero (CSRZ) and others as known by those skilled in the art. Advanced modulation techniques have become a major enabler for long-reach wavelength division multiplexing (WDM) transmission at 40 Gb/s or above data rates. Core network trends in the industry for longer signal transmission distance (thereby reducing signal regeneration) and higher bit rate have resulted in large scale deployment of remotely re-configurable optical add/drop multiplexers (ROADM) to bring signals on and off the backbone. Deployment of dynamic optical networks (i.e. optical routing networks) increases operating efficiency and also presents new challenges. For example, in an optical routing network, the optical signals will pass through successive optical filters as they are transported to and through each of the ROADMs along the route. Additionally, signals with a different wavelength or the same wavelength at a different time period (phase) may travel on different routes. Because of the differing routes, the signals may experience different optical filtering as the number of ROADMs along different routes will vary.

For differential-phase modulated optical communication system, a delay-interferometer (DI) with a free-spectral range (FSR) equal (approximately) to the symbol rate is commonly used as the demodulator. When no optical filtering is employed, it is well known by those in the art, that using a demodulator with DI FSR equal to the symbol rate typically yields optimal performance (lowest losses). When strong optical filtering is employed, as in the case where 40 Gb/s signals travel through multiple 50 GHz-spaced ROADMs, the performance of DBPSK-based WDM systems can be significantly improved by using a demodulator with DI FSR greater than the typical symbol rate (approximately equal to the bit rate for DBPSK).

In an optical routing network, the optimal DI FSR settings for different wavelengths or the same wavelength at a different time period (phase) can be quite different, largely due to different filtering conditions. For example, using a traditional demodulator with 'fixed' DI FSR (the tunable range for FSR is very small and therefore considered negligible) for all wavelengths, only some of the wavelengths will yield optimal transmission performance, i.e. lowest inter-symbol interference (ISI). Consequently, the transmission performance of many other wavelengths can be severely degraded due to non-optimal demodulator setting as an inevitable consequence of a design utilizing a 'fixed' DI FSR and an assumption regarding the amount of filtering. An additional drawback to this design is a significant optical signal-to-noise ratio (OSNR) penalty if the deployed network configuration and wavelength routing do not experience the assumed worst case filtering effect.

Figure 1:
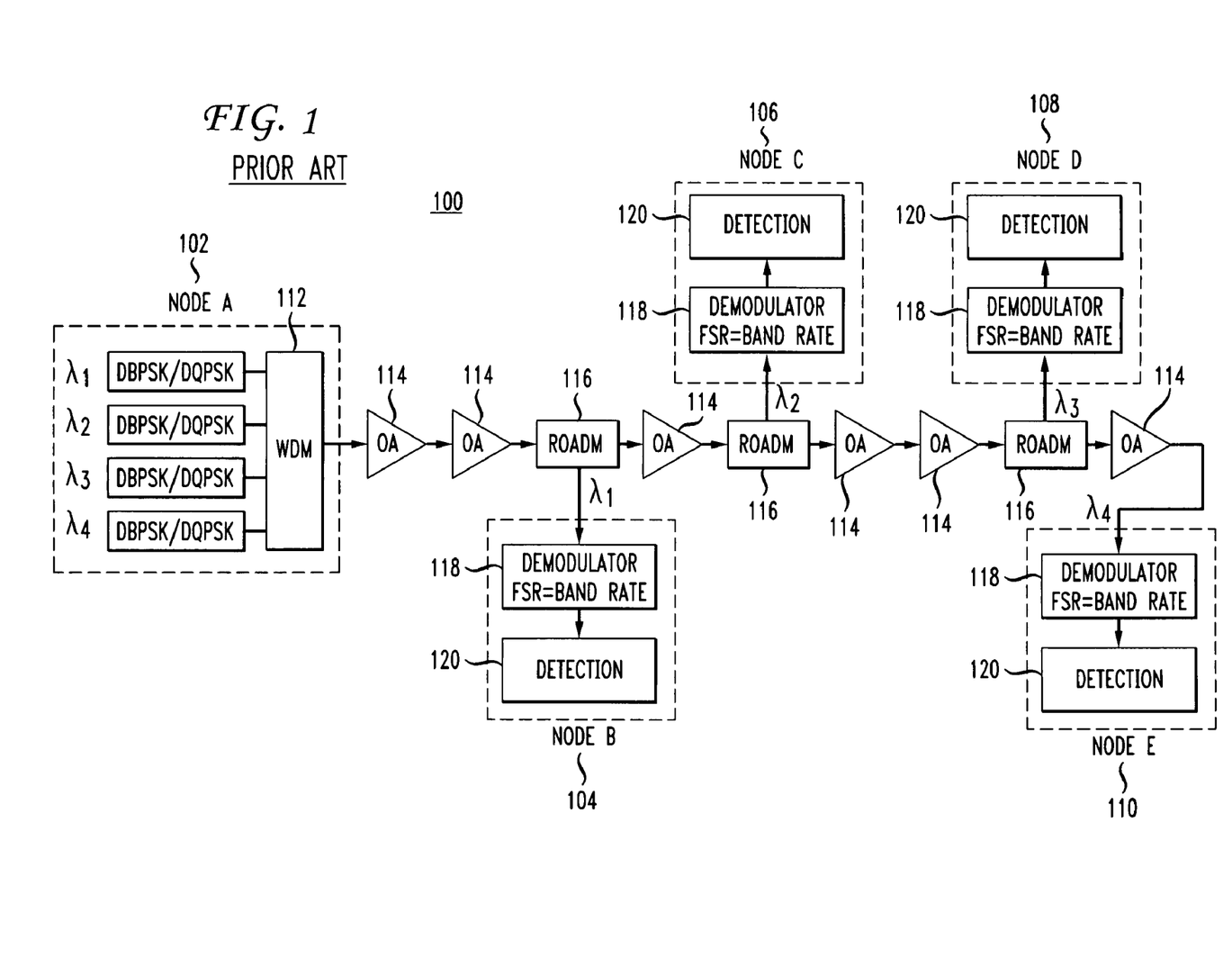
FIG. 1 is a prior art schematic illustration of an optical routing network using common differential phase-modulated optical communication system.

FIG. 1 shows a prior art schematic illustration 100 of a differential phase-modulated optical communication system as commonly used in optical routing networks. In this specific example there is shown a plurality of nodes, A 102, B 104, C 106, D 108 and E 110. Optical signals at four distinct wavelengths $\lambda_1$, $\lambda_2$, $\lambda_3$ and $\lambda_4$ are transmitted from node 102 (the source node) to nodes 104, 106, 108 and 110 (the destination nodes). The signals are generated per known differential-phase modulated optical signal generation techniques such as DBPSK or DQPSK, as known by those skilled in the art. Along the signals' path from source to destination node, they will pass through a single wave division multiplexer (WDM) 112, multiple optical amplifiers (OAs) 114 and one or more remotely re-configurable optical add/drop multiplexers (ROADMs) 116. Each destination node, 104, 106, 108 and 110, is comprised of two components, a demodulator 118 and a detection unit 120. As shown in FIG. 1, $\lambda_1$ will pass through one ROADM 116 as it travels from node 102 to node 104, while $\lambda_2$ will pass through two ROADMs 116 as it travels from node 102 to node 106, and $\lambda_3$ and $\lambda_4$ will pass through three ROADMs 116 as they travel from node 102 to nodes 108 and 110, respectively. Inside each ROADM 116 are optical filters which attenuate part of the spectral component of the signal. As signals are successively passed through ROADMs 116 they are increasingly filtered, yielding a stronger optical filtering effect. In this example, different wavelengths will see different filtering conditions. With the differential phase-modulated optical communication system illustrated in FIG. 1, the free-spectral range (FSR) of each of the plurality of demodulators 118 is fixed to be around the symbol/baud rate. As a result of the filtering effect on optical signals as they are passed through successive ROADMs 116 as discusses above, it will be obvious to those skilled in the art that only $\lambda_1$ may operate at a point that is close to the optimal performance point while $\lambda_3$ and $\kappa_4$ will definitely operate at non-optimal levels.

Figure 2A:
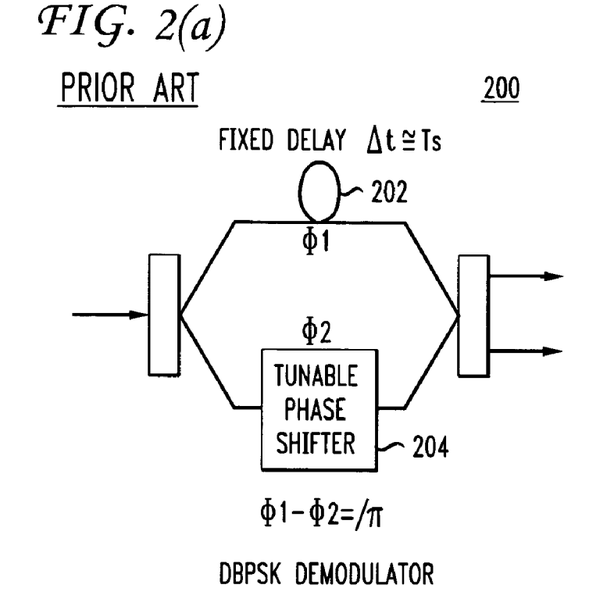
Figure 2B:
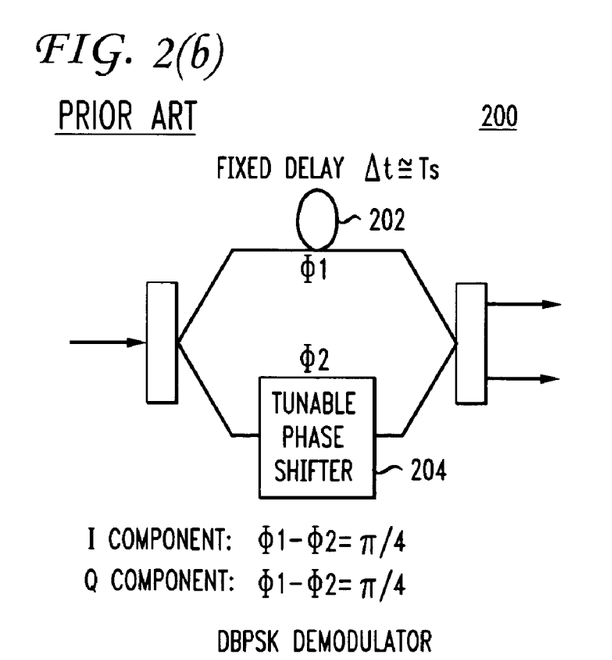

In FIG. 2 is shown a prior art schematic 200 illustration of common (a) DBPSK and (b) DQPSK demodulators. For both demodulators, the path delays 202 are fixed to be close to the symbol period (Ts)/baud rate while a tunable phase shift 204 is introduced to achieve the required phase difference between the two paths. For the DBPSK technique the tunable phase shifter 204 is typically set to 0 or $\pi$, while for the DQPSK technique it is typically set to $\pm\pi/4$. The tunable phase shift 204 is also used for frequency tuning as well as small delay fluctuation compensation. The phase difference 204 between the two paths depends on the optical frequency as well as the time delay $\Delta t$, which in this case is close to the symbol period (Ts)/baud rate.

It would therefore be desirable to significantly improve the performance of DQPSK-based WDM systems by using a demodulator with DI FSR greater than the typical symbol rate (approximately equal to half the bit rate for DQPSK) when strong optical filtering is applied as is the case when 100 Gb/s signals go through multiple 50 GHz-spaced ROADMs. Additionally, it would be desirable to substantially suppress inter-symbol interference (ISI) caused by optical filtering by optimizing/adjusting the demodulator FSR setting for both DBPSK and DQPSK-based communication systems.

SUMMARY OF THE INVENTION

In accordance with an aspect of the invention, there is disclosed a differential-phase modulated optical communication system. The system generally comprises: a demodulator having a tunable element to adjust the free-spectral range (FSR) thereof, and a tunable phase shifter to adjust a frequency of a signal passing therethrough.

In accordance with another aspect of the invention, there is disclosed a differential-phase modulated optical communication system. The system generally comprises: a demodulator having an element for introducing a fixed delay with a free-spectral range (FSR) substantially equal to a symbol rate, and a tunable phase shifter and second delay element to adjust a frequency of a signal passing therethrough.

In accordance with yet another aspect of the invention, there is disclosed a differential-phase modulated optical communication system. The system generally comprises: a plurality of nodes, each including a demodulator having a tunable element to adjust the free-spectral range (FSR) thereof, and a tunable phase shifter to adjust a frequency of a signal passing therethrough.

In accordance with yet another aspect of the invention, there is disclosed a differential-phase modulated optical communication system. The system generally comprises: a plurality of nodes, each including a demodulator having an element for introducing a fixed delay with a free-spectral range (FSR) substantially equal to a symbol rate, and a tunable phase shifter and second delay element to adjust a frequency of a signal passing therethrough.

In accordance with yet another aspect of the invention, in a differential-phase modulated optical communication system there is disclosed a method of demodulating signals. The method generally comprises the steps of: passing the signals through a tunable element to adjust the free-spectral range (FSR) thereof, and a tunable phase shifter to adjust a frequency therethrough; and combining and outputting said signals for detection.

In accordance with yet another aspect of the invention, in a differential-phase modulated optical communication system there is disclosed a method of demodulating signals. The method generally comprises the steps of: passing the signals through a fixed element with a free-spectral range (FSR) substantially equal to a symbol rate, and a tunable phase shifter and second delay element to adjust a frequency of a signal passing therethrough; and combining and outputting said signals for detection.

These and further aspects and advantages of the invention will become apparent to those skilled in the art as the present invention is described with particular reference to the accompanying drawings.

BRIEF DESCRIPTION OF THE DRAWINGS

FIG. 2 is a prior art schematic illustration of an embodiment of common DBPSK (a) and DQPSK (b) demodulator;

FIG. 4 is a schematic illustration of an embodiment of DBPSK (a) and DQPSK (b) demodulators in accordance with the present invention;

FIG. 5 is a schematic illustration of a second embodiment of DBPSK (a) and DQPSK (b) demodulator in accordance with the present invention.

DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The present invention provides a new method to improve the performance of differential phase-modulated optical communication systems against wavelength-dependent optical filtering impairments in an optical routing network. It comprises a free-spectral range (FSR) tunable delay interferometer to be used as the DBPSK (differential binary phase shift key) or DQPSK (differential quadrature phase shift key) demodulator. In accordance with the present invention, both the frequency and the FSR of the demodulator are adjustable. The FSR can be adjusted by a tunable delay element while the frequency can be adjusted by using a tunable phase shifter. A single tunable element can be used to adjust both the FSR and the frequency of the demodulator. Because both the FSR and the frequency of the demodulator are adjustable, every wavelength can operate at optimal performance (lowest ISI) within the optical routing network.

Figure 3:
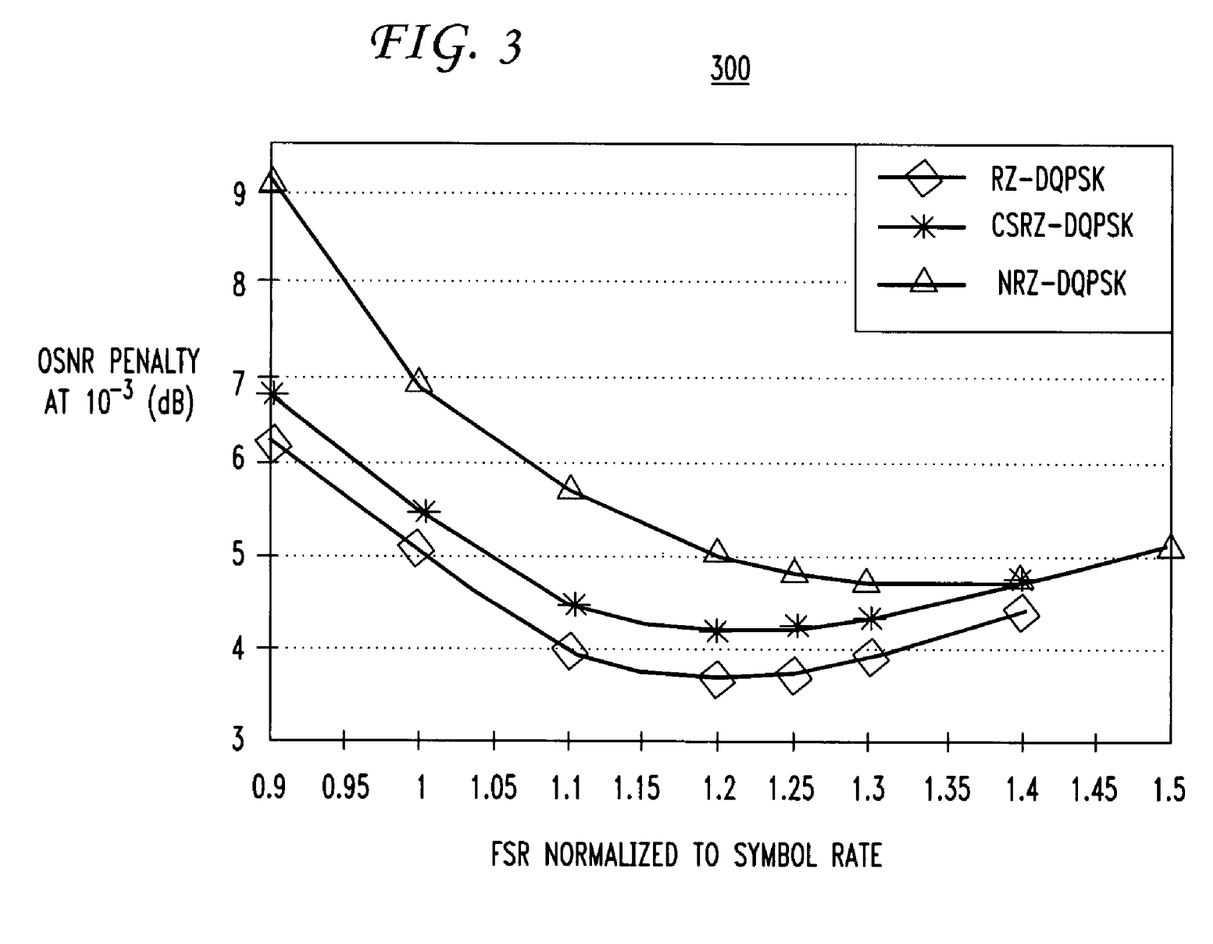
FIG. 3 is a graph of simulated results on the impact of demodulator FSR for three different DQPSK modulation formats under strong filtering.

In FIG. 3 is shown a graph 300 of a simulated optical signal-to-noise ratio (OSNR) penalty (loss) versus delay-interferometer (DI) with a free-spectral range (FSR), the combination referred to as DI FSR, of the demodulator for several typical DQPSK modulation techniques (RZ-DQPSK, CSRZ-DQPSK and NRZ-DQPSK) under strong optical filtering. The OSNR penalty is defined as the difference between the required OSNR under the filtered condition and the required OSNR when exact symbol rate-FSR and no filter are used. In this simulation, the narrow filter consists of two cascaded 42.5 GHz 2rd-order Gaussian filters followed by a 0.31 nm first-order Gaussian filter (the 3 dB bandwidth is 29.5 GHz, 20 dB bandwidth is 53.0 GHz), and the symbol rate is 42.8 GHz. From FIG. 3 one can see that for all the three DQPSK modulation techniques, the optimal FSR is larger than the symbol rate. The performance difference between the optimal FSR and the common symbol rate delay is more than 1.4 dB, 1.3 dB and 2.2 dB for RZ-DQPSK, CSRZ-DQPSK and NRZ-DQPSK, respectively. It is also shown that the OSNR penalty is significantly increased when the FSR is smaller than the symbol rate.

Figure 4A:
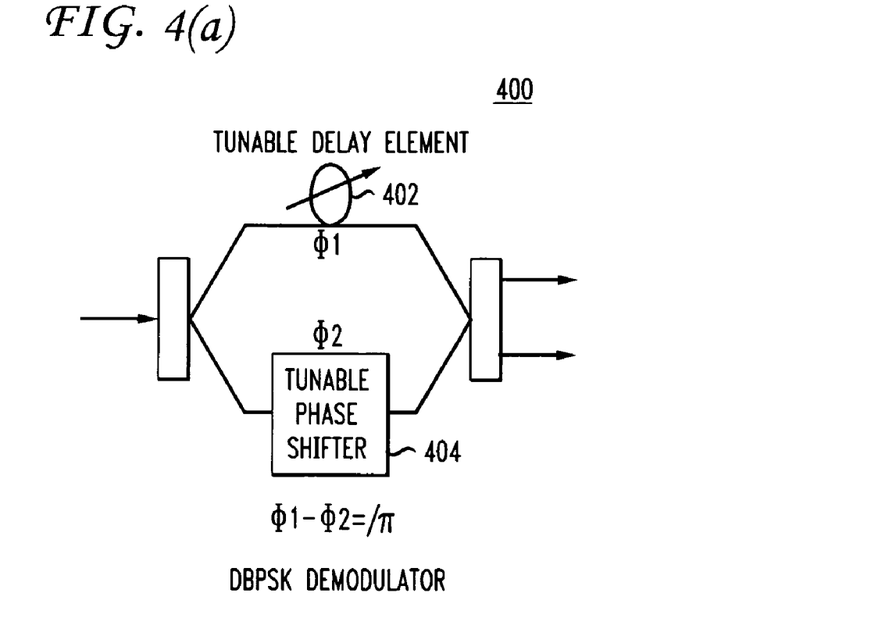
Figure 4B:
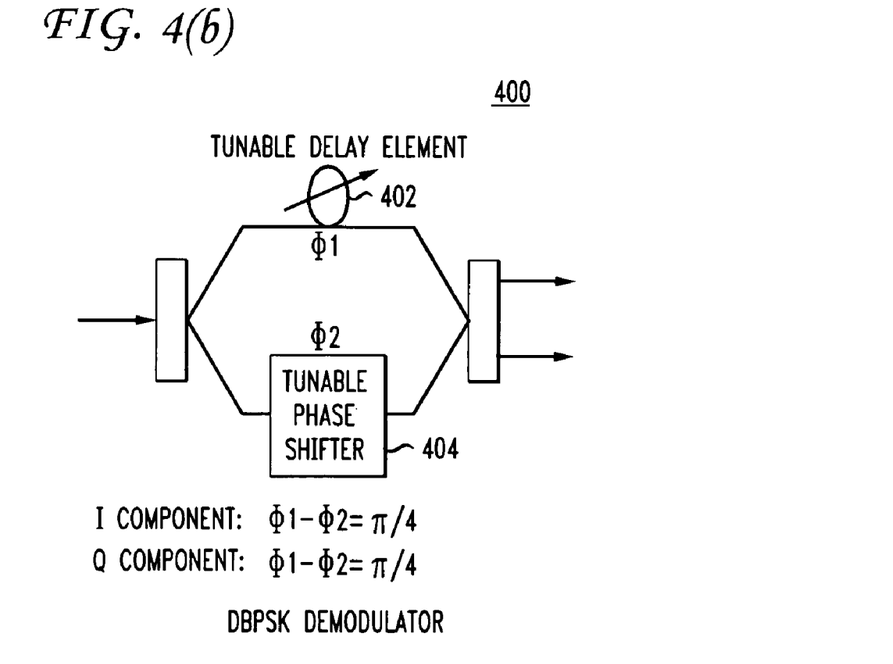

FIGS. 4(a) and (b) show a first embodiment 400 of DBPSK and DQPSK demodulators in accordance with the present invention, where a tunable delay element 402 is introduced to achieve FSR-tunable capability while the frequency is tuned through a tunable phase shifter 404. For the DBPSK technique the tunable phase shifter 404 is typically set to 0 or $\pi$, while for the DQPSK technique it is typically set to $\pm\pi/4$. For this embodiment, conventional piezoid- or free-space/fiber-based tunable delay lines may be used as the tunable delay element 402, as the required time delay granularity and accuracy is just a fraction of the baud period.

Figure 5A:
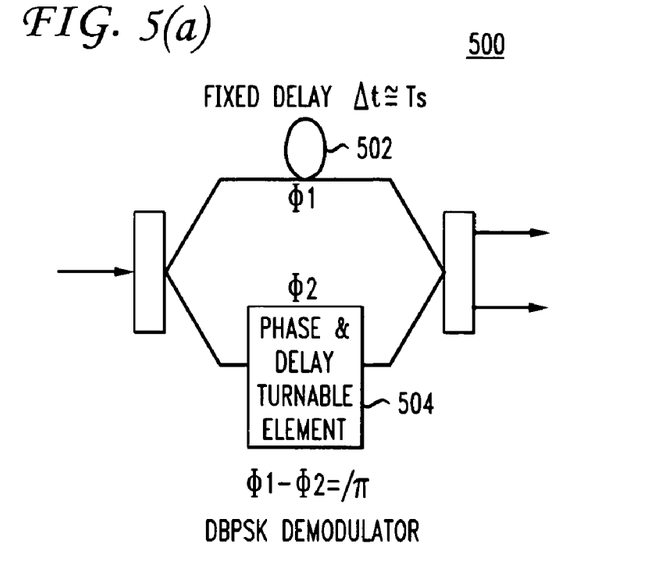
Figure 5B:
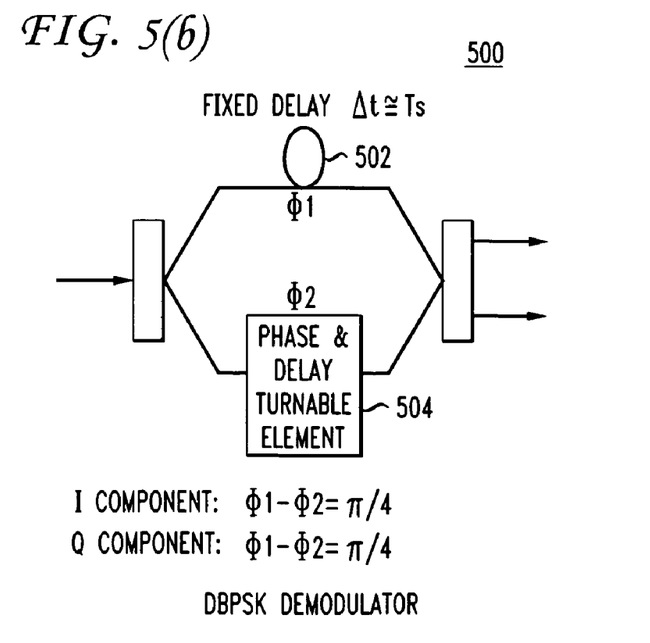

FIGS. 5(a) and (b) show a second embodiment 500 of DBPSK and DQPSK demodulators in accordance with the present invention, where the path delay 502 is fixed and a single phase & delay tunable element 504 is used to adjust both FSR and frequency. For the DBPSK technique the phase & delay tunable element 504 is typically set to 0 or $\pi$, while for the DQPSK technique it is typically set to $\pm\pi/4$. For this embodiment, the single phase & delay tunable element 504 may be implemented by using a piezoid-based tunable delay line with high-precision control circuitry.

Figure 6:
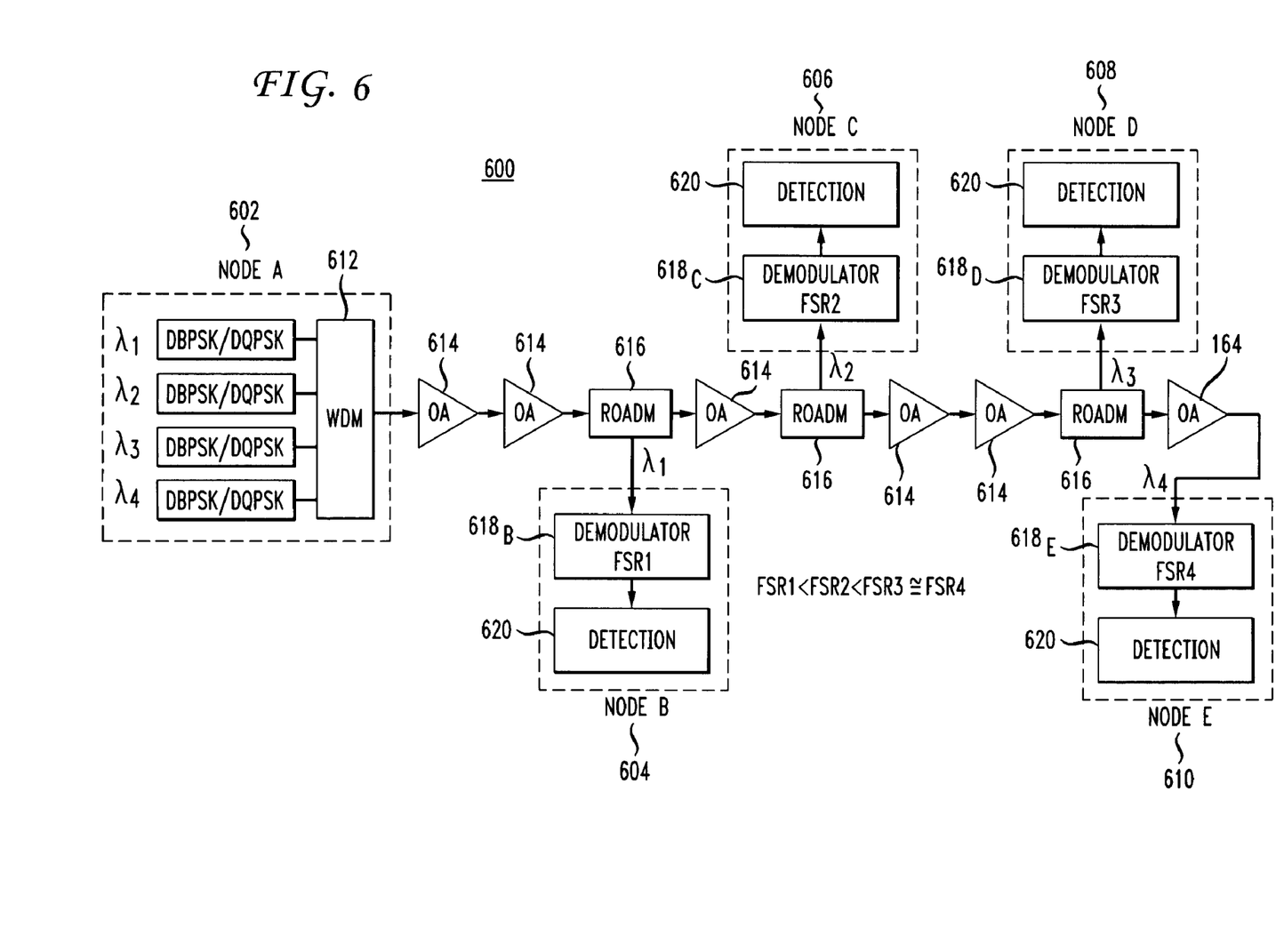
FIG. 6 is a schematic illustration of an optical routing network using the improved differential phase-modulated optical communication system in accordance with the present invention.

The expedient 600 illustrated in FIG. 6 shows a five-node optical routing network using the improved differential phase-modulated optical communication system in accordance with the present invention. In this embodiment, the FSR settings for different wavelengths are optimized individually and dynamically by taking into account the different filtering conditions, specifically the number and severity of optical filtering. FIG. 6 is similar to FIG. 1 (with similar numbering conventions) excepting the design of the demodulators $618_B$, $618_C$, $618_D$ & $618_E$. The design of the demodulators are as described in FIGS. 4 and 5 of the present invention where either a tunable delay element (402) is combined with a tunable phase shifter (404, as shown in FIG. 4) or where a fixed delay (502) is combined with a phase & delay tunable element (504, as shown in FIG. 5). The design of the demodulators adjust the FSR based on the fore mentioned number and severity of optical filtering. As shown in FIG. 6, $\lambda_1$ will pass through one ROADM 616, while $\lambda_2$ will pass through two ROADMs 616, and $\lambda_3$ and $\lambda_4$ will pass through three ROADMs 616 as they travel through the optical network, with signals increasingly filtered, yielding a stronger optical filtering effect. In this example, to yield optimum performance levels on all wavelengths, FSR values in each demodulator 618 will need to have the following relationship: FSR1<FSR2<FSR3$\cong$FSR4, in demodulators $618_B$, $618_C$, $618_D$ & $618_E$ respectively. Consequently, as compared to the conventional method (see FIG. 1) where only some of the wavelengths can operate close to or at optimum performance levels (lowest ISI), the present invention shown in FIG. 6 allows every wavelength to operate at its individual optimum performance level. In optical routing networks with many wavelengths (some networks for example routinely run >40 wavelengths), allowing every wavelength to operate at an optimal performance level can improve system capacity and reliability while simultaneously reducing operating costs.

The present invention has shown that the performance of differential-phase modulated optical communication systems can be significantly improved by employing demodulators having FSR greater than the typical symbol rate when strong optical filtering is applied. It has also been shown that different wavelengths may see different filtering conditions in an optical-routing network, and therefore the optimal FSR setting for different wavelengths can be quite different. Systems and methods for designing FSR-tunable delay interferometers used as demodulators for differential-phase modulated optical communication systems in an optical routing network, where the FSR settings for different wavelengths can be optimized individually and dynamically by taking into account the different filtering conditions are disclosed. As compared to conventional demodulation methods where only part of the wavelengths can operate at an optimal performance point (in terms of ISI suppression), the proposed systems and methods allow every wavelength to operate at its individual optimal performance point.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A differential-phase modulated optical communication system, comprising:
a demodulator comprising a tunable element to adjust a free-spectral range associated with the demodulator, the free-spectral range being adjusted in response to a characteristic of an optical signal received by the demodulator, the demodulator comprising a tunable phase shifter to adjust a frequency of the optical signal.

2. The optical communication system recited in claim 1, wherein the demodulator comprises a delay-interferometer.

3. The optical communication system recited in claim 1, wherein the demodulator utilizes differential binary phase shift keying.

4. The optical communication system recited in claim 1, wherein the demodulator utilizes differential quadrature phase shift keying.

5. The system of claim 1, wherein the tunable element adjusts the free-spectral range in response to a characteristic of the optical signal comprising a number of filters through which the optical signal passed before reaching the tunable element.

6. The system of claim 1, wherein the tunable element adjusts the free-spectral range in response to a characteristic of the optical signal comprising a severity of filtering experienced by the optical signal before reaching the tunable element.

7. The system of claim 1, wherein the tunable element adjusts the free-spectral range in response to a characteristic of the optical signal comprising a wavelength of the optical signal.

8. A differential-phase modulated optical communication system comprising:
a demodulator comprising a first optical path comprising an element for introducing a fixed delay with a free-spectral range substantially equal to a symbol rate associated with an optical signal passing through the demodulator, the demodulator comprising a second optical path comprising a tunable phase shifter to adjust a frequency associated with the optical signal, the second optical path of the demodulator comprising a tunable element to adjust the free-spectral range associated with the demodulator, the free-spectral range being adjusted in response to a characteristic of the optical signal passing through the demodulator.

9. The optical communication system recited in claim 8, wherein the demodulator comprises a delay-interferometer.

10. The optical communication system recited in claim 8, wherein the demodulator utilizes differential binary phase shift keying.

11. The optical communication system recited in claim 8, wherein the demodulator utilizes differential quadrature phase shift keying.

12. The system of claim 8, wherein the tunable element adjusts the free-spectral range in response to a characteristic of the optical signal comprising a number of filters through which the optical signal passed before reaching the tunable element.

13. The system of claim 8, wherein the tunable element adjusts the free-spectral range in response to a characteristic of the optical signal comprising a severity of filtering experienced by the optical signal before reaching the tunable element.

14. A differential-phase modulated optical communication system comprising:
a plurality of nodes, each of the plurality of nodes comprising a demodulator having a tunable element to adjust a free-spectral range associated with the demodulator, the free-spectral range being adjusted in response to a characteristic of an optical signal passing through the demodulator, the demodulator comprising a tunable phase shifter to adjust a frequency associated with the optical signal.

15. The system of claim 14, wherein the tunable element adjusts the free-spectral range in response to a characteristic of the optical signal comprising a number of filters through which the optical signal passed before reaching the tunable element and a severity of filtering experienced by the optical signal before reaching the tunable element.

16. A differential-phase modulated optical communication system comprising:
a plurality of nodes, each of the plurality of nodes comprising a demodulator comprising a first optical path including an element for introducing a fixed delay with a free-spectral range substantially equal to a symbol rate associated with an optical signal passing through the demodulator, the demodulator comprising a second optical path comprising a tunable phase shifter to adjust a frequency associated with the optical signal, the second optical path of the demodulator comprising a tunable element to adjust the free-spectral range of the demodulator, the free-spectral range being adjusted in response to a characteristic of the optical signal.

17. The system of claim 16, wherein the tunable element adjusts the free-spectral range in response to a characteristic of the optical signal comprising a number of filters through which the optical signal passed before reaching the tunable element and a severity of filtering experienced by the optical signal before reaching the tunable element.

18. In a differential-phase modulated optical communication system, a method of demodulating signals comprising:
passing the signals through a first optical path associated with a demodulator comprising a tunable element to adjust the free-spectral range associated with the demodulator;
adjusting the free-spectral range in response to a characteristic of the signals;
passing the signals through a second optical path associated with the demodulator comprising a tunable phase shifter to adjust a frequency associated with the signals; and
combining and outputting the signals from the first optical path and the second optical path for detection.

19. The method of claim 18, wherein the tunable element adjusts the free-spectral range in response to a characteristic of the optical signal comprising a number of filters through which the signals pass before reaching the tunable element and a severity of filtering experienced by the signals before reaching the tunable element.

20. In a differential-phase modulated optical communication system, a method of demodulating signals comprising:
passing the signals through a first optical path associated with a demodulator comprising a fixed element with a free-spectral range substantially equal to a symbol rate associated with the signals passing through the first optical path; and
passing the signals through a second optical path associated with the demodulator, the second optical path comprising a tunable phase shifter to adjust a frequency of the signals, the second optical path comprising a tunable element to adjust the free-spectral range associated with the demodulator, the free-spectral range being adjusted in response to a characteristic of the signals; and
combining and outputting the signals from the first optical path and the second optical path for detection.

* * * * *